Jan. 4, 1944.  S. W. E. ANDERSSON  2,338,563
THERMOSTATIC ELEMENT
Filed Aug. 14, 1941  3 Sheets-Sheet 1
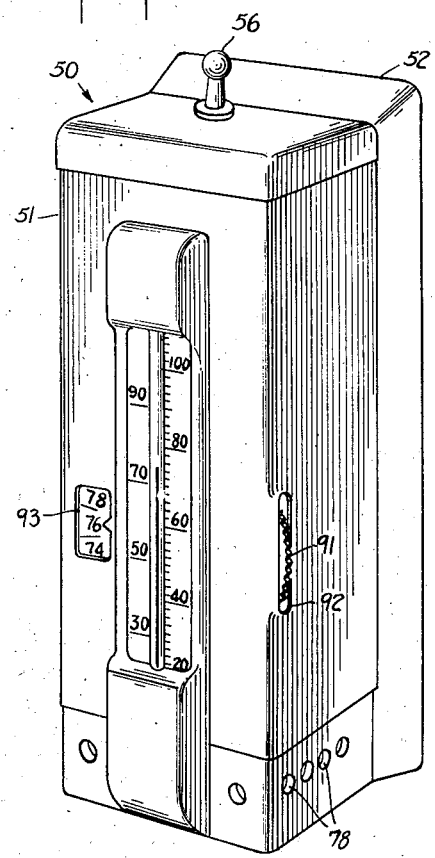
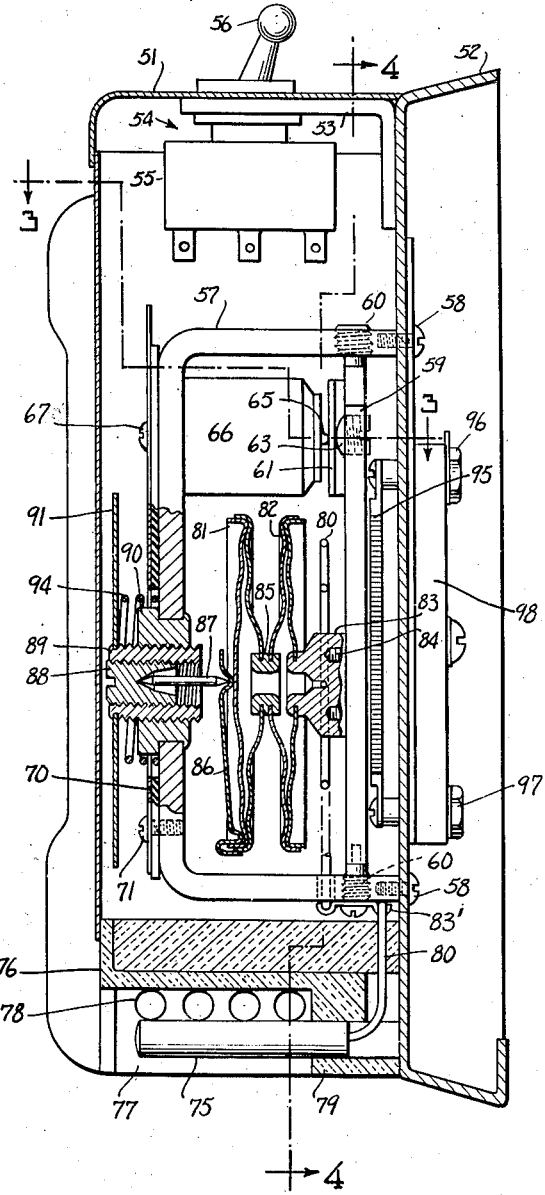
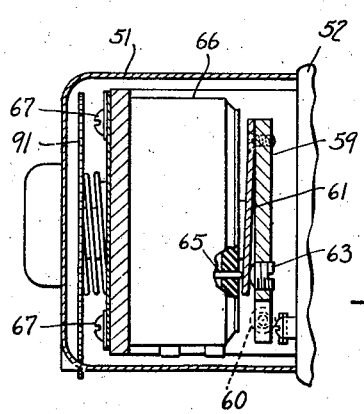
INVENTOR
Sven W. E. Andersson
BY
his ATTORNEY

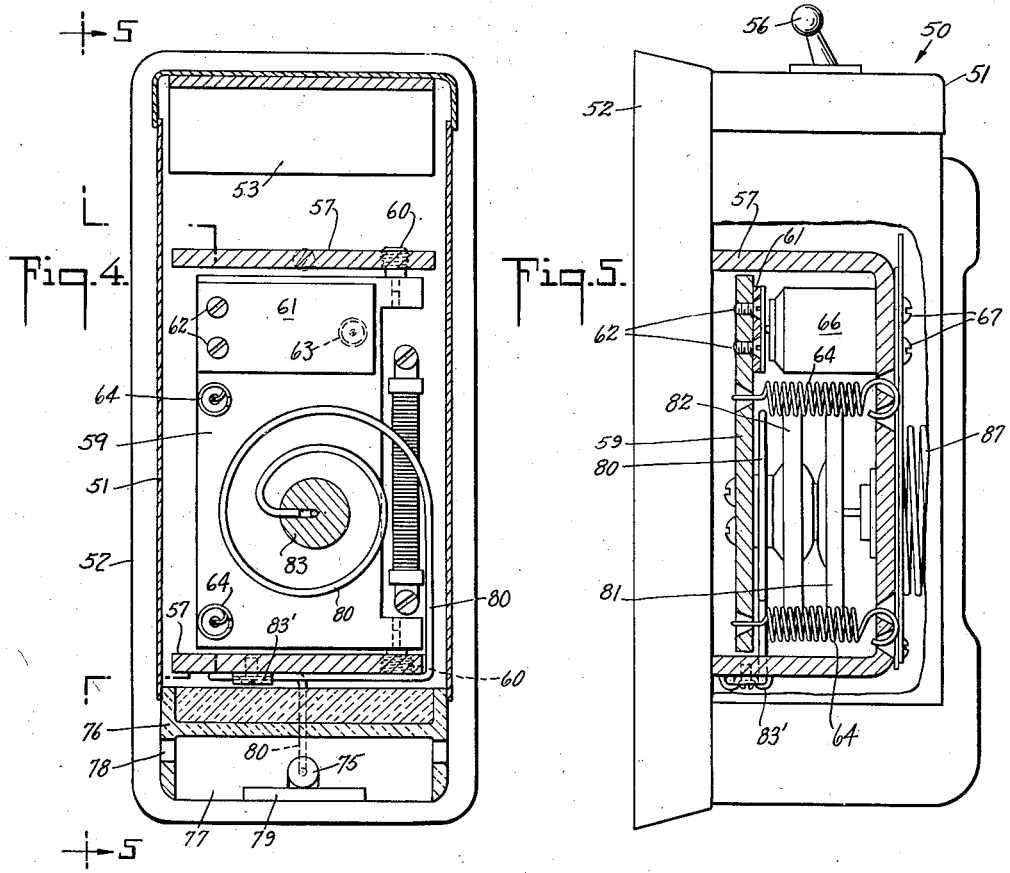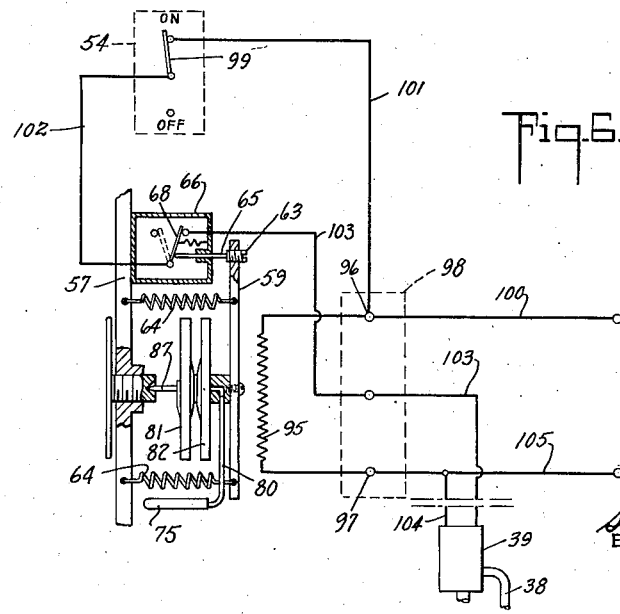

Patented Jan. 4, 1944

2,338,563

UNITED STATES PATENT OFFICE 2,338,563

THERMOSTATIC ELEMENT

Sven W. E. Andersson, Evansville, Ind., assignor to Servel, Inc., New York, N. Y., a corporation of Delaware Application August 14, 1941, Serial No. 406,778

4 Claims. (Cl. 200—140)

This invention relates to thermostatic elements, and more particularly to such elements of the vapor charged type.

It is an object of the invention to provide an improvement whereby the responsiveness of thermostatic elements is improved considerably without impairing the sensitivity of such elements.

This is accomplished by providing a thermostatic element which is charged with a suitable volatile fluid and includes an expansible and contractible portion from which mechanical energy is derived, and another portion which is in fluid communication with the expansible portion and referred to as the thermal sensitive portion. During operation, the expansible and contractible portion is always maintained at a slightly higher temperature than the thermal sensitive portion, as by artificial heating, so that the thermal sensitive portion will always be at a lower temperature than other portions of the thermostatic element with the internal pressure thereof always corresponding to the temperature of the thermal sensitive portion. The thermal sensitive portion is preferably formed of very thin material so that it will have a small mass for low heat capacity, the thin material possessing good heat conductivity to effect rapid heat transfer. The thin walled thermal sensitive portion is preferably arranged so that it is readily influenced by the temperature in the environment in which it is disposed, whereby the expansible and contractible portion will respond rapidly to produce mechanical movement, corresponding to temperature change.

The novel features which are believed to be characteristic of the invention are set forth with particularity in the claims. The invention, both as to organization and method, together with the above and other objects and advantages thereof, will be better understood by reference to the following description taken in connection with the accompanying drawings forming a part of this specification, and of which:

Fig. 1 is a perspective view of a control provided with a thermostatic element embodying the invention;

Fig. 2 is a vertical sectional view of the control shown in Fig. 1 to illustrate the thermostatic element more clearly;

Fig. 3 is a horizontal sectional view, taken at line 3—3 of Fig. 2, to illustrate more clearly parts of the control with which the thermostatic element is associated;

Fig. 4 is a vertical sectional view, taken at line 4—4 of Fig. 2, to illustrate more clearly the positioning of the thermostatic element in the control;

Fig. 5 is a side view, taken at line 5—5 of Fig. 4, to illustrate more clearly the manner in which the thermostatic element is embodied in the control;

Fig. 6 is a view diagrammatically illustrating the electrical circuit in which the control is connected.

Figure 7:
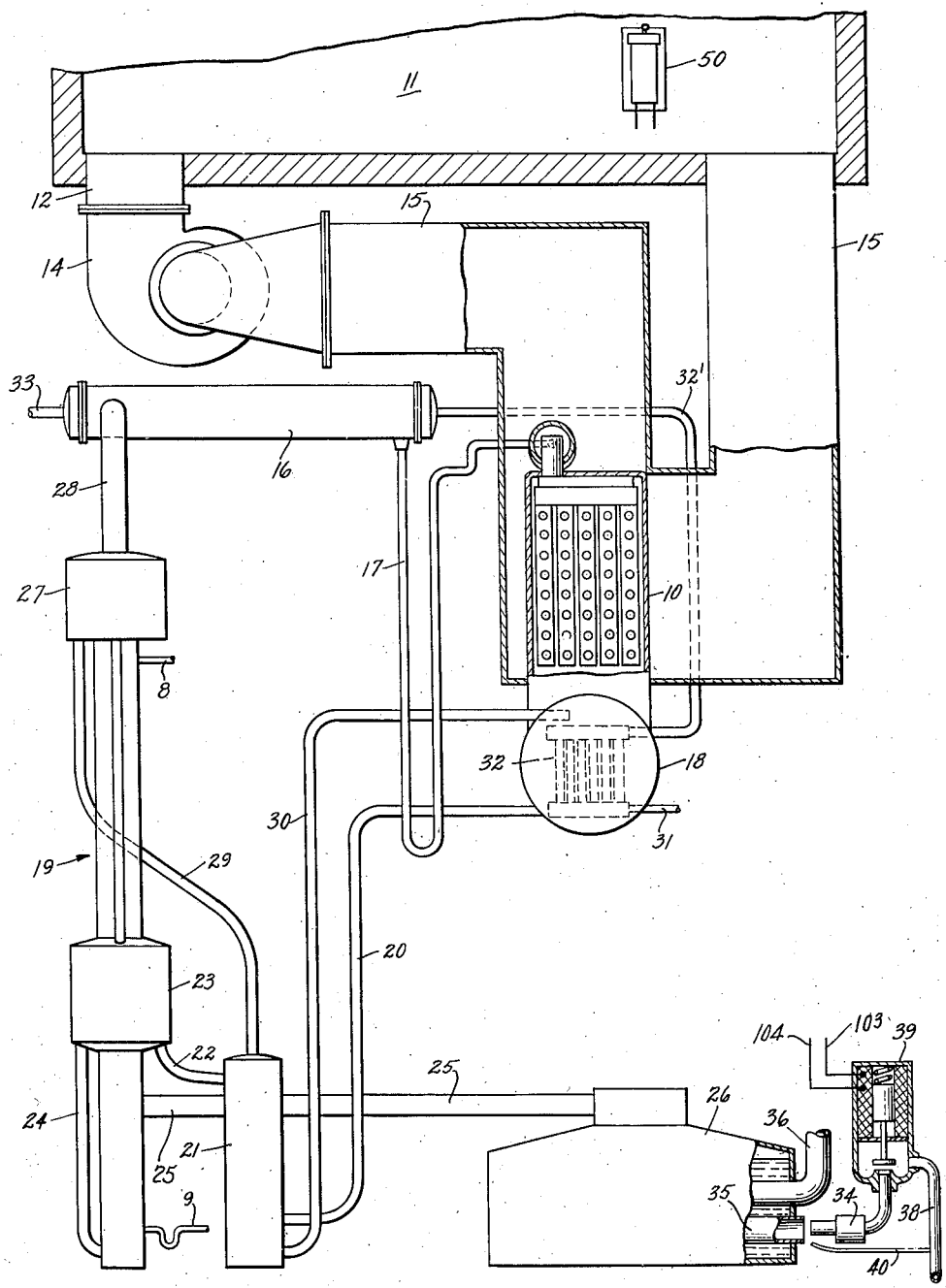
Fig. 7 is a view diagrammatically illustrating a cooling system with which is associated the electrical circuit illustrated in Fig. 6 having connected therein the control embodying the invention.

Referring to Fig. 7, the invention is shown in connection with a cooling system comprising a refrigeration unit having a cooling element 10 arranged in a duct system. The duct system includes a duct 12 through which air is withdrawn from the enclosure 11 by a blower 14, the air being discharged by the blower into a duct 15 through which it is returned to the enclosure. During operation of the refrigeration unit, cooling effect is transmitted by cooling element 10 to air flowing through duct 15.

The cooling element 10 forms part of a refrigeration unit of a two-pressure absorption type and like that described in application Serial No. 239,762 of A. R. Thomas and P. P. Anderson, Jr., filed November 10, 1938. In a system of this type liquid refrigerant, such as, for example, water, is introduced into the upper part of cooling element 10 from a condenser 16 through a path of flow including a conduit 17. The liquid refrigerant evaporates in cooling element 10 with consequent absorption of heat to produce a refrigerating or cooling effect to cool air passing through duct 15, as explained above.

The refrigerant vapor formed in cooling element 10 flows therefrom to an absorber 18 in which the vapor is absorbed into a liquid absorbent, such as, for example, lithium chloride solution. The absorption liquid enriched in refrigerant is conducted from absorber 18 to generator 19 through a path of flow including a conduit 20, a first passage in liquid heat exchanger 21, a conduit 22, a vessel 23 and conduit 24. Within generator 19 are disposed a plurality of riser tubes enveloped by a chamber formed by the outer shell to which steam is supplied through a conduit 25 from a boiler 26. The chamber formed by the outer shell of the generator 19 provides for full length heating of the riser tubes, a vent 8 being provided at the top part of the outer shell. A trap conduit 9 is connected to the bottom part of the outer shell to provide a drain for condensate formed in the generator 19.

The heating of the riser tubes by the steam causes refrigerant vapor to be expelled from the absorbent, the expelled vapor being effective to raise liquid absorbent by gas or vapor-lift action. The expelled vapor passes from the upper ends of the riser tubes into a vapor separator 27 and thence flows through a conduit 28 to condenser 16 in which the vapor is liquefied. The liquid refrigerant formed in condenser 16 flows to the upper part of cooling element 10, as explained above, to complete the refrigerating cycle.

The raised absorption liquid from which refrigerant vapor has been expelled is conducted from the upper part of generator 19 to absorber 18 to absorb refrigerant vapor, this liquid being conducted to the absorber in a path of flow including a conduit 29, a second passage in liquid heat exchanger 21, and conduit 30 which is connected to the upper part of the absorber.

The condenser 16 and absorber 18 constitute heat rejecting parts of the refrigeration unit and are cooled by a suitable cooling medium, such as, for example, water, which is conducted from a suitable source of supply through a conduit 31 to a bank of tubes 32 within the absorber whereby heat, resulting from absorption of refrigerant vapor by liquid adsorbent, is given up to the cooling water. The water is conducted from absorber 18 through a conduit 32' to condenser 16 in which heat of condensation, resulting from condensation of refrigerant vapor, is given up to the cooling water. The cooling water leaves the condenser 16 through a conduit 33.

In order to simplify the drawings the parts of of the refrigeration unit having not been shown in detail, such an illustration of the parts not being necessary for an understanding of this invention. The disclosure in the aforementioned Thomas and Anderson application may be considered as being incorporated in this application and, if desired, reference may be made thereto for a detailed description of the refrigeration unit.

The steam boiler 26 is arranged to be heated by a burner 34, the flame of which is adapted to project into a heating tube 35 disposed within the boiler. After passing through the heating tube 35 the combustion gases are discharged through a vertical flue 36. The heating of boiler 26 by burner 34 produces steam which passes through conduit 25 to generator 29.

A combustible gas is delivered to burner 34 through a conduit 38 from a suitable source of supply, the flow of such gas being controlled by an electro-magnetically operated valve 39. Suitable tubing 40 is connected to conduit 38 and arranged to terminate in the vicinity of the burner 34 to provide a pilot flame for igniting the gas discharged from the burner when the valve 39 is opened after a period when no gas flows to the burner.

The valve 39, which controls the flow of gas to burner 34 and hence the cooling effected by cooling element 10, is operated by a control device 50. As diagrammatically shown in Fig. 7, the control device 50 is located in the enclosure 11 so that it is capable of effecting control of the electro-magnetically operated valve 39 responsive to a temperature condition affected by air in the enclosure.

Referring now more particularly to Figs. 1 to 5 inclusive, the control device 50 comprises a casing 51 fixed to a backplate 52 which is adapted to be fastened on a wall in any suitable manner. To the top part of backplate 52 is secured an agle member 53, as shown in Fig. 2, having the horizontal part thereof serving as a support for a switch 54. The switch 54 is enclosed in a casing 55 and provided with a snap-acting operating lever 56 which extends through the top of the casing 51. The switch 54 may be of the single-pole, single-throw type, as diagrammatically illustrated in Fig. 6, and in connected in an electrical circuit including valve 39, in a manner to be described presently.

A U-shaped main bracket 57 is located within the casing 51 with the horizontal arms thereof secured at their rear ends by screws 58 to the backplate 52. A vertical plate 59, which will be referred to as a swinging or hinged door, is journaled at 60 to the top and bottom horizontal arms of main bracket 57. A tongue 61 is secured at one edge by screws 62 to the hinged door 59, as shown in Fig. 4. At a region near the hinge side of the swinging door 59 the latter is formed with a threaded opening to receive a set screw 63 which is positioned to bear against the free end of tongue 61.

Referring more particularly to Fig. 5 the hinged door 59 is biased toward the front of casing 51 by coil springs 64 each having one end secured to the front vertical part of main bracket 57 and the other end secured to the edge of the swinging door 59 to which the tongue 61 is secured. In the path of movement of the swinging door 59 is disposed a pin or plunger 65 of a switch 66 which is mounted by screws 67 to the vertical part of main bracket 57, as best shown in Fig. 3. As diagrammatically illustrated in Fig. 6, the switch 66 is spring-biased to a first position to complete an electric circuit and is movable to another position to open or break the electric circuit when plunger 65 is moved toward the front vertical part of main bracket 57. The switch 66 may be of a well known micro-switch type which is operated with only a relatively short movement of the plunger or pin 65. Movement of the pin 65 toward the left in Fig. 2 is effected by movement of the swinging door 59 toward the front vertical part of main bracket 57. When the hinged door 59 moves toward the rear of control device 50, the pin 65 also moves toward the right since the movable element 68 of switch 66 is spring-biased to move to the rear position, as diagrammatically illustrated in Fig. 6.

The screws 67 which hold the switch 66 in position are effectively insulated from one another, the openings through which they pass in the vertical part of main bracket 57 being considerably larger than the screws. The screws 67 and switch 66 are properly located in position by a plate 70 which is fastened by screws 71 to the front vertical part of main bracket 57, as shown most clearly in Fig. 2. The positioning plate 70 is formed of insulating material and provided with openings which are approximately the size of screws 67, whereby the latter are positioned to hold switch 66 in its desired relationship with other parts of the control device 50.

An expansible fluid thermostat, which operates responsive to a temperature condition of the air in enclosure 11, is employed to cause swinging door 59 to move rearwardly against the action of coil springs 64. The expansible fluid thermostat includes a thermal bulb 75 which is located in the bottom part 76 of control device 50. The bottom part 76 is formed of suitable material having poor thermal conductivity, such as Bakelite, for example, and is provided with a recess 77 in the extreme lower part and openings 78 in the front and side walls thereof. The thermal bulb 75 is located in the recess 77 opposite the side opening 78, so that air circulating in the enclosure or space 11 readily contacts and flows over the exterior surfaces of the thermal bulb 75. The rear part of bulb 75 is held in position by a lock plate 79, also formed of a material having poor thermal conductivity, which is fastened in any suitable manner to the bottom of the block 76.

The thermal bulb 75 is connected by a capillary tube 80 to a pair of expansible and contractible elements 81 and 82. As best shown in Figs. 2 and 4, the capillary tube 80 passes through an opening in the rear of block 76 and also through a slot in the bottom horizontal arm of main bracket 57. The upper end of capillary tube 80 is spirally wound about a hollow hub member 83 having a passage to which the extreme upper end of the capillary tube is secured. As shown most clearly in Fig. 2, the hub member 83 is secured by screws 84 to the swinging door 59. By clamping the capillary tube 80 at 83' to the bottom horizontal arm of main bracket 57, movements of the thermal bulb 75 and also the bottom part of the capillary tube will not be transmitted to the spirally wound upper part thereof.

The elements 81 and 82 are in the form of expansible bellows or hollow diaphragms with one face of rear bellows 82 secured to hub member 83 and the other face thereof secured to a second hollow hub member 85. One face of the front bellows 81 is secured to the hub member 85 and the other face thereof is in the form of a solid disc or diaphragm. The expansible bellows 81 and 82, capillary tube 80 and thermal bulb 75 constitute a thermostatic element, which will be described more fully hereinafter and which is charged with a suitable volatile fluid having an increasingly higher pressure with rise of temperature causing swelling of the bellows, and a decreasingly lower pressure with fall of temperature permitting contraction of the bellows.

To the peripheral edge portion of bellows 81 is fixed one end of a leaf spring 86, the other end of which is provided with a depression engaged to contact and engage the center region of the bellows. The depression in leaf spring 86 receives a tapered end of a pin 87, the other tapered end of which fits in a recess formed in a set screw 88. The tapered ends of pin 87 are slightly rounded and lapped in to insure permanent calibration of the control device 50. The set screw 88 threadedly engages an adjustment nut 89 which in turn threadedly engages a bushing 90 secured in an opening in the front vertical part of main bracket 57.

A circular plate 91, upon which a suitable dial is adapted to be mounted, is fixed to the front part of adjustment nut 89. The peripheral edge of plate 91 is serrated and arranged to be accessible at a notch or opening 92 in casing 51 to facilitate turning of the dial. The dial mounted on plate 91 is provided with temperature indicia adapted to pass in the vicinity of a window 93 provided at the front of casing 51. By turning the plate 91, therefore, the dial associated therewith can be turned so that the desired temperature reading will be opposite the notch formed in window 93. In order to insure that the dial 91 will remain at the position to which it is adjusted, a coil spring 94 is interposed between the rear of plate 91 and the front vertical part of main bracket 57.

Within and at the rear of casing 51 is provided a heating element 95 which is connected to terminals 96 and 97 on a panel 98 fixed to the rear side of backplate 52, as shown in Fig. 2, such panel being diagrammatically illustrated in Fig. 6. The manually operable switch 54 at the top of control device 50, and switch 66 which is operable in accordance with rise and fall of temperature in the enclosure 11, are connected in an electrical circuit having connections to the terminals on the panel 98.

In order to simplify as much as possible the illustrations of the structural features in Figs. 1 to 5 inclusive, the electrical connections of the switches 54 and 66 to the terminals on panel 98 have been omitted in these figures. The connections to the panel 98 of the switches described above are, however, diagrammatically illustrated in Fig. 6 to facilitate an understanding of the electrical circuit.

When it is desired to operate the refrigeration unit to effect cooling of air, switch 54 of control device 50 is operated by moving the lever or member 56 at the top of casing 51 to cause the movable switch element 99 in Fig. 6 to move from the "off" position to the "on" position. When the temperature of air tends to rise above the temperature setting of the dial in the window 93 of casing 51, the pressure of the volatile fluid in the expansible fluid thermostat increases to cause sufficient swelling of the bellows 81 and 82 to cause the refrigeration unit to operate to effect cooling of air. With such swelling of bellows 81 and 82 the swinging door 59 is forced rearwardly from the front vertical part of main bracket 57 against the action of coil springs 64. As diagrammatically illustrated in Fig. 6, the rearward movement of the swinging door permits movement of the pin or plunger 65 toward the right with sufficient swelling of the bellows 81 and 82 to permit snap action movement of the element 68 from the position shown in dotted lines to that shown in solid lines, whereby an electrical circuit is completed for the electro-magnetically operated valve 39 to cause the latter to open and permit flow of gas to burner 34.

The electrical circuit for the valve 39 from the source of electrical energy includes conductors 100 and 101, element 99 of switch 54, conductor 102, element 68 of switch 66, and conductor 103 to one terminal of the electro-magnetically operated valve 39. From the other terminal of the valve 39 the circuit is completed through conductors 104 and 105 back to the source of electrical energy. When the element 68 moves to its solid line position in Fig. 6, therefore, the above-described circuit is completed to cause energization of the electro-magnetically operated valve 39. The opening of valve 39 allows fuel to be supplied through conduit 38 to the burner 34 so that the boiler 26 will be heated to produce steam for operating the refrigeration unit in the manner explained above. With blower 14 operating to withdraw air from enclosure 11, air is caused to pass over the surfaces of cooling element 10 in duct 15 through which the cooled air is returned to the enclosure 11.

Conversely, when the temperature air in enclosure 11 falls, the bellows 81 and 82 contract due to decrease in pressure of the volatile fluid within the expansible fluid thermostat. With contraction of the bellows the coil springs 64 are effective to pull the swinging door 59 toward the front vertical part of rear bracket 59. When the swinging door 59 has moved forward sufficiently, the pin or plunger 65 of the switch 66 causes the element 68 associated therewith to move with a snap action to the dotted line position in Fig. 6. With such movement of element 68, the electrical circuit for the valve 39 is broken, thereby permitting the latter to close and shut off flow of fuel to burner 34. When burner 34 is rendered inoperative and heat is no longer supplied to boiler 26, the supply of steam to generator 19 is cut off so that the cooling effect produced by cooling element 10 will be reduced.

The interrelation of the component parts of the control device 50 is such that sensitive and dependable control of air temperature is effected. In a control which has been built and embodying features like those illustrated in Figs. 1 to 5 inclusive and described above, a switch of the micro-switch type and generally like that disclosed in Patent No. 1,960,020, is employed as the switch 66. A switch of this type can be caused to operate with a temperature change in a range between 0.3 to 0.6° F.; that is, with such temperature change a snap-action of the switch is effected. In the control referred to above, the bellows 81 and 82 are formed of beryllium-copper approximately .016 inch thick with the diaphragms being heat-treated to maximum hardness after the peripheral edges thereof have been secured by silver solder. The bellows 81 and 82 formed of beryllium-copper together expand approximately .0016 inch per degree of Fahrenheit to effect a snap-action movement of switch 66, a movement of only .00015 to .00035 inch being required with a change in pressure of 1¼ to 2 ounces on the plunger or pin 65.

The expansible fluid thermostat of which the bellows being described form a part preferably has a so-called limited charge of isobutane, that is, the charge of volatile fluid is sufficient to produce saturated vapor with a temperature as high as 95° F., which is safely above the upper limit of the thermostat adjustment of the control device 50. In such case the bellows 81 and 82 contain superheated vapor above 95° F., so that the pressure at extremely high temperatures often encountered during shipping and storage only increases slowly according to the ideal gas law. By employing an expansible fluid thermostat having only a limited charge, the pressure increase that occurs with rise of temperature above the normal working temperature range is limited, so that the diaphragms of the bellows can be formed from relatively thin material from which more useful movement can be obtained.

It is desirable to employ a volatile fluid having a high vapor pressure, such as isobutane, for example, in order to reduce the effect of barometric changes. The thickness of the diaphragms forming the bellows 81 and 82 and the size thereof should always be selected so that straining above the elastic limit is avoided under all the conditions encountered.

The thermostatic element embodied in the control device 50 is so constructed and arranged that the control is exceptionally rapid in responding to change of air temperature. For this reason the expansible fluid thermostat concludes not only the expansible and contractible bellows 81 and 82, which is the usual practice in bellows type thermostatic elements heretofore provided, but also the capillary tube 80 and thermal bulb 75. In addition, the heater 95 is provided to cause heating of air within the casing 51, so that the bellows 81 and 82 and a major part of the capillary tube 80 will be disposed in an environment which is at a slightly higher temperature than the bulb 75 located in the recess 77 formed in the bottom part 76 of the control device.

In any system charged with a volatile fluid, the pressure therein always corresponds to the temperature of the coldest part, because the temperature attained by the coldest part determines the amount of volatile fluid in liquid phase and in gas or vapor phase. When the temperature of the coldest part rises, a greater amount of volatile fluid is in gas phase to cause the pressure in the system to increase; and conversely, when the temperature of the coldest part falls, some condensation occurs with a smaller amount of volatile fluid in gas phase to bring about a reduction of pressure in the system.

In order to insure that the thermal bulb 75 will always be at a lower temperature than other parts of the thermostatic element, and hence serve as the only sensitive part of the element, the other parts or portions thereof comprising the capillary tube 80 and bellows 81 and 82 are always kept somewhat above the ambient temperature by the heating element 95. With the thermal bulb 75 serving as the only sensitive part of the thermostatic element, the bulb is preferably formed of very thin material having good heat conductivity in order to reduce its heat capacity to a minimum.

One of the factors to be considered in obtaining a control which responds rapidly is the internal volume of the entire thermostatic element of which the sensitive bulb forms a part. For a given transfer of heat to the sensitive bulb a definite quantity of volatile liquid vaporizes, and the smaller the internal volume of the thermostatic element the greater will be the pressure increase resulting from vaporization of such definite quantity of volatile liquid. Hence, it is exceedingly important to employ a thermostatic element having as small an internal volume as practicable and at the same time of such proportion that adequate mechanical energy will be produced to cause operation of the control device 50.

The thin-walled thermal bulb 75 at the bottom of the control device 50 is well exposed to the air so that the thermostatic element as a whole responds rapidly to changes in air temperature. It is desirable to form the bulb 75 as small as practicably possible and with relatively thin walls, so that there is very little heat absorption by the metal with rise of air temperature, and very little heat dissipation by the metal with fall of temperature. This is quite different from thermostatic elements of the vapor-charged type which employ expansible and contractible bellows alone and are relatively sluggish in operation, because of the relatively large amount of heat required to be taken up and given off by the diaphragm metal forming the bellows.

With the so-called limited charge of isobutane, for example, the sensitive bulb 75 only contains volatile liquid in the order of a few hundredths of a cubic inch at the lower regulating temperature of 55° F. With rise of air temperature heat from air is transmitted through the thin-walled sensitive bulb 75 to cause some vaporization of the liquid. Since a greater amount of volatile fluid is now in gas phase within the thermostatic element, the internal pressure increases to impart mechanical movement of the control parts, the bellows 81 and 82 acting with considerable power to effect movement of the swinging door 59. Conversely, with fall of air temperature, heat is immediately given up by the volatile fluid through the thin-walled bulb 75 to cause some condensation of vapor. Since less volatile fluid is now in vapor phase, the internal pressure within the thermostatic element is reduced to cause or permit movement of the control parts.

It should be understood that the heater 95 is continuously and constantly heating the interior of casing 51 of the control device 50. The heater 95 is always energized across the source of electrical energy through the conductors 100 and 105, as diagrammatically illustrated in Fig. 6. The heater 95 insures that the temperature within casing 51 will always be slightly higher than the temperature of air flowing over and in contact with the exterior surfaces of thermal bulb 75, so that the latter will always be the coldest part of the thermostatic element. It should be understood that the heater 95 increases and improves the responsiveness of the thermostatic element as a whole, either when it is utilized in connection with a cooling system as illustrated herein and described above or when utilized in a heating system or any other type of device necessitating the employment of a thermostatic element of the vapor-charged type. Hence, the heater 95 differs from the usual type of artificial heater heretofore provided for thermostatic elements in that such heaters are employed intermittently and not continuously and are utilized only to control a source of heating to offset poor responsiveness by improving the sensitivity of the element solely to terminate or reduce heating in accordance with a false room temperature.

In the control referred to above in which bellows 81 and 82 formed of beryllium-copper are employed, the capillary tube 80 is formed of soft annealed copper and the sensitive bulb 75 is formed of brass having a wall thickness of .0035 inch and an outside diameter of 3/32 inch. The size of heater 95 is approximately 0.5 watt, which has been found to keep the average temperature within the casing 100 approximately 5° F. above the room temperature. This temperature differential appears to be sufficient for all ordinary conditions, whereby the interior of the control device 50 is well above the ambient temperature even with rapid rise of the latter temperature.

With the heater being used continuously to heat the interior of casing 51 during periods when operation of the cooling system is required, the control device can be completely enclosed so that the sensitivity of the control device will not be impaired by accumulation of dust and the like on parts of the control device. In order to protect the thermal bulb 75 from the heated space within the casing 51, the bottom 76 is formed of a suitable material, such as Bakelite, for example, having poor heat conductivity. While the bottom 76 is formed of insulating material so that the sensitive bulb 75 is as close as possible to room air temperature, the bulb may actually be one or two degrees above the room air temperature due to slight heat leakage to the bulb. Compensation can readily be made for such a condition by properly setting the dial on the dial plate 91. The thermometer on the face of the control device 51, which is shown in Fig. 1, is also compensated to indicate the correct room air temperature even though there is heat leakage from within the casing 51.

Instead of providing a separate sensitive bulb 75, the lower end portion of capillary tube 80 may be arranged to serve as the sensitive part of the thermostatic element. If desired, heat dissipating fins may be provided along the capillary tube 80 to reduce the amount of heat transmitted through the tube to the sensitive bulb 75. In order to reduce heat leakage to the bulb through the capillary tube, the latter may be formed of material such as, for example, stainless steel, having poorer heat conductivity than copper. The casing 51 may be made as air-tight as possible by providing the window 93 with a transparent covering and forming the notch or slot 92 just large enough for a portion of the serrated peripheral edge of the dial plate 91 to pass therein.

Instead of using a heating element 95, an electric light bulb may be disposed within the casing 51 for the purpose of artificially heating the interior of the casing in the same manner as the heater 95. With the use of an electric light bulb, the dial on which the temperature indicia are formed may be made of suitable translucent material to render the numerals more visible and in this way facilitating the setting of the dial.

It has been stated above that by keeping the average temperature within the casing 51 approximately 5° F. above the room temperature, satisfactory operation of the thermostatic element is effected. It is desirable to limit the size of the heater because an excess amount of heat is objectionable because a condition is then encountered of too much heat leakage to the sensitive bulb 75. Further, the temperature of the bulb 75 under such conditions to too high above the room air temperature and is more affected by air velocity. In other words, an unusually high air velocity tends to cool the thermal bulb 75 when a condition may actually exist requiring additional cooling by the refrigeration unit to bring down the room air temperature. By keeping the temperature differential within safe limits so that proper operation of the thermostatic element results with air velocities normally encountered in practice, proper control over the operation of the cooling system is always effected.

Although a single embodiment of the invention has been shown and described, it will be apparent to those skilled in the art that various modifications and changes may be made without departing from the spirit and scope of the invention. For example, the improved thermostatic element may be embodied in temperature-recording devices and any other devices or controls where movement is imparted to a part by the element with change of temperature. It is therefore contemplated to cover all modifications and changes which come within the spirit and scope of the invention, as pointed out in the following claims.

What is claimed is:

1. In combination with a control member to which movement is to be imparted, a thermostatic element comprising an expansible and contractible portion, a thermal sensitive portion, and a narrow tube connecting said expansible and contractible portion and said thermal sensitive portion, said contractible and expansible portion being operatively associated with the control member and constructed and arranged to produce mechanical energy with changes of temperature to impart movement to the control member, heating means for maintaining said expansible and contractible portion at a higher temperature than said thermal sensitive portion, said thermal sensitive portion being formed of a material having high thermal conductivity and a wall thickness in the order of .0035 inch, said thermostatic element being adapted to be located in an enclosure in which the temperature of the air is controlled responsive to the control member, said thermal sensitive portion being closely adjacent to said expansible and contractible portion and normally at a temperature a few degrees above the temperature of air in the enclosure due to heat conduction along said narrow tube, the internal volume of said thermostatic element being as small as practicable having regard to proportioning of said expansible and contractible portion to ensure that adequate mechanical strength will be produced to cause movement to be imparted to the control member, said thermal sensitive portion being more or less freely suspended in the air so that said thermostatic element as a whole responds rapidly to changes in air temperature, said thermostatic element having a limited charge of a volatile fluid sufficient to produce only saturated vapor therein at a predetermined temperature, so that the internal pressure developed within said thermostatic element at extremely high temperatures above said predetermined temperature only increases slowly according to the ideal gas law.

2. In combination with a control member to which movement is to be imparted, a casing within which such member is located, said casing being adapted to be located in an enclosure in which the temperature of air is controlled responsive to the control member, a thermostatic element comprising an expansible and contractible portion within said casing, a thermal sensitive portion outside said casing, and a narrow tube connecting said expansible and contractible portion and said thermal sensitive portion, a movable part within said casing upon which said contractible and expansible portion is mounted and bodily movable with movement of said part, said contractible and expansible portion being operatively associated with the control member and constructed and arranged to produce mechanical energy with changes of temperature to impart movement to the control member, the portion of said narrow tube within said casing being coiled to provide a flexible connection to said expansible and contractible portion without adversely affecting movement of the latter with changes of temperature, means for heating the interior of said casing to maintain said expansible and contractible portion at a higher temperature than said thermal sensitive portion, said thermal sensitive portion being formed of a material having high thermal conductivity and a wall thickness in the order of .0035 inch, said thermal sensitive portion being closely adjacent to the vicinity of said casing and normally at a temperature a few degrees above the temperature of air in the enclosure due to heat conduction along said narrow tube and slight heat leakage thereto from within said casing, the internal volume of said thermostatic element being as small as practicable having regard to proportioning of said expansible and contractible portion to insure that adequate mechanical strength will be produced to cause movement to be imparted to the control member, said thermal sensitive portion being more or less freely suspended in the air so that said thermostatic element as a whole responds rapidly to changes in air temperature, said thermostatic element having a limited charge of a volatile fluid sufficient to produce only saturated vapor therein at a predetermined temperature, so that the internal pressure developed within said thermostatic element at extremely high temperatures above said predetermined temperature only increases slowly according to the ideal gas law.

3. In combination with a control member to which movement is to be imparted, a casing within which such member is located, said casing being adapted to be located in an enclosure in which the temperature of air is controlled responsive to the control member, a thermostatic element comprising an expansible and contractible portion within said casing, a thermal sensitive portion outside said casing, and a narrow tube connecting said expansible and contractible portion and said thermal sensitive portion, said contractible and expansible portion being operatively associated with the control member and constructed and arranged to produce mechanical energy with changes of temperature to impart movement to the control member, means for heating the interior of said casing to maintain said expansible and contractible portion at a slightly higher temperature than said thermal sensitive portion, said thermal sensitive portion being formed of a material having high thermal conductivity and a wall thickness in the order of .0035 inch, said thermal sensitive portion being closely adjacent to the vicinity of said casing and normally at a temperature a few degrees above room temperature due to heat conduction along said narrow tube and slight heat leakage thereto from within said casing, said thermal sensitive portion being more or less freely suspended in the air so that said thermostatic element as a whole responds rapidly to changes in temperature, and said thermostatic element having a limited charge of a volatile fluid sufficient to produce only saturated vapor therein at a predetermined temperature, so that the internal pressure developed within said thermostatic element at extremely high temperatures above said predetermined temperature only increases slowly according to the ideal gas law.

4. In combination with a control member to which movement is to be imparted, such control member normally being located in an enclosure in which the temperature of air is controlled responsive to the control member, a casing within which such member is located, a thermostatic element comprising an expansible and contractible portion within said casing, a thermal sensitive portion outside said casing, and a narrow tube connecting said expansible and contractible portion and said thermal sensitive portion, said contractible and expansible portion being operatively associated with the control member and constructed and arranged to produce mechanical energy with changes of air temperature to impart movement to the control member, means including a dial operatively associated with said contractible and expansible portion for adjusting the latter to determine the temperature at which it is desired to maintain the air in the enclosure, said dial including indicia running from a low temperature to a predetermined higher temperature, means for heating the interior of said casing to maintain said expansible and contractible portion at a slightly higher temperature than said thermal sensitive portion, said thermal sensitive portion being formed of a material having high thermal conductivity and a wall thickness in the order of .0035 inch, said thermal sensitive portion being closely adjacent to the vicinity of said casing and normally at a temperature slightly above temperature of air in the enclosure due to heat conductivity along said narrow tube and slight heat leakage thereto from within said casing, the internal volume of said thermostatic element being as small as practicable and at the same time said expansible and contractible element being so proportioned that adequate mechanical energy will be produced to cause operation of the control member, said thermal sensitive portion being more or less freely suspended in the air so that said thermostatic element as a whole responds rapidly to changes in air temperature, said thermostatic element having a limited charge of a volatile fluid sufficient to produce only saturated vapor therein in the neighborhood of said predetermined higher temperature, so that the internal pressure developed within said thermostatic element at extremely high temperatures above said predetermined higher temperature only increases slowly according to the ideal gas law.

SVEN W. E. ANDERSSON.